US008674627B2

(12) United States Patent
Hwang et al.

(10) Patent No.: US 8,674,627 B2
(45) Date of Patent: Mar. 18, 2014

(54) ISOLATED FLYBACK CONVERTER FOR LIGHT EMITTING DIODE DRIVER

(75) Inventors: Jong Tae Hwang, Seoul (KR); Moonsang Jung, Seoul (KR); Daeho Kim, Seoul (KR)

(73) Assignee: Dongbu Hitek Co., Ltd., Seoul (KR)

( * ) Notice: Subject to any disclaimer, the term of this patent is extended or adjusted under 35 U.S.C. 154(b) by 182 days.

(21) Appl. No.: 13/468,330

(22) Filed: May 10, 2012

(65) Prior Publication Data

US 2013/0033197 A1 Feb. 7, 2013

(30) Foreign Application Priority Data

Aug. 5, 2011 (KR) ........................ 10-2011-0078122

(51) Int. Cl.
*H05B 37/02* (2006.01)
*H02M 3/335* (2006.01)

(52) U.S. Cl.
USPC ........ 315/308; 315/291; 315/212; 363/21.09; 363/21.12

(58) Field of Classification Search
CPC ................... H02M 3/33523; H02M 2001/346; H02M 2001/348; H05B 33/0815; H05B 33/0803; H05B 33/0806; H05B 33/0842; H05B 33/0875; H05B 33/0884; H05B 41/2827; H05B 41/2828
USPC ......... 315/307, 224, 254, 219, 291, 302, 272, 315/274, 276; 363/21.09, 21.12
See application file for complete search history.

(56) References Cited

U.S. PATENT DOCUMENTS 6,720,740 B2 * 4/2004 Toyama ........................ 315/247
7,109,667 B2 * 9/2006 Matsushima et al. ......... 315/224
7,136,292 B1 * 11/2006 Chan et al. ................. 363/21.09
7,239,091 B2 * 7/2007 Shinmen et al. .............. 315/224
7,561,452 B2 * 7/2009 Mednik et al. .................. 363/97
7,781,987 B2 * 8/2010 Cheng et al. .................. 315/307
8,213,191 B2 * 7/2012 Liang ......................... 363/21.12
8,339,055 B2 * 12/2012 Zhan et al. ..................... 315/219
8,344,657 B2 * 1/2013 Zhan et al. ..................... 315/302
8,441,204 B2 * 5/2013 Otake et al. .................. 315/291
2010/0141178 A1 6/2010 Negrete et al.

FOREIGN PATENT DOCUMENTS

JP 11-146641 5/1999
JP 2007-104881 4/2007
JP 2010-284031 12/2010
KR 10-2006-0099625 9/2006

* cited by examiner

*Primary Examiner* — Vibol Tan
(74) *Attorney, Agent, or Firm* — Sherr & Jiang, PLLC

(57) ABSTRACT

An isolated flyback converter for an LED driver includes a snubber circuit unit connected to the primary side of a transformer; and a snubber voltage detection unit which detects a snubber voltage of the snubber circuit unit and generates a reference voltage proportional to the detected snubber voltage. Further, the isolated flyback converter includes a switching unit with a source terminal and a drain terminal, and may be turned on or off in response to an arbitrary logic signal. Furthermore, the isolated flyback converter includes a control unit which compares a voltage supplied through the switching current sensing resistor with the reference voltage, and supplies a logic signal at relatively high level or relatively low level to the switching unit to control the switching unit such that a secondary-side current of the transformer is maintained relatively constant.

18 Claims, 11 Drawing Sheets

FIRING ANGLE=60

FIRING ANGLE=90

ISOLATED FLYBACK CONVERTER FOR LIGHT EMITTING DIODE DRIVER

The present application claims priority to Korean Patent Application No. 10-2011-0078122 (filed on Aug. 5, 2011), which is hereby incorporated by reference in its entirety.

BACKGROUND

An LED lamp may have advantages of low power consumption and long lifetime compared to a fluorescent lamp, an incandescent lamp, a three-wave fluorescent lamp, or similar devices. In order to drive LED illumination devices, input power supplied to the home may be alternating current, and/or a converter which converts alternating current to direct current may be needed.

When being driven with alternating-current (AC) power, the LED illumination devices may be broadly classified into an isolation type and a non-isolation type devices. In the case of an isolation type, there may be no risk of an electric shock because an LED load ground and an AC power supply ground may be electrically separated from each other, however there may be a problems with relatively high manufacturing costs.

FIG. 1 shows an isolation-type LED lamp driver circuit based on a flyback converter, in accordance with the related art. The flyback converter may be used because the flyback converter may require only one high-voltage switching element, and therefore the flyback converter may have a relatively simple structure and/or may be implemented at relatively lower cost.

AC power may be a full-wave rectified through a rectifier. A full-wave rectified signal may be converted to DC through a filter and used. In this case, however, a separated circuit may be needed to maximize power factor.

A flyback converter structure may be used to transmit energy to the LED load insulated from the rectified power. In the flyback converter structure, energy may be stored in a magnetizing inductance on the primary side of a transformer while a switch is turned on, and/or energy in the magnetizing inductance may be transmitted to an LED load on the secondary side of the transformer when the switch may be turned off.

A controller may serve to control the on/off operation of the switch such that the secondary-side LED current may have a desired value. To control the secondary-side current, it may be necessary to detect the secondary-side current and/or to feed back the detected secondary-side current to the controller. Since the primary side and the secondary side may be needed insulated from each other, it may necessary to use an element, such as an opto-coupler, which may transmit a signal through light to feed back the current. In FIG. 1, a snubber may serve to suppress high-voltage spark due to resonance caused by parasitic inductance when the switch is turned off.

With this structure, it may be possible to control the LED current constant regardless of a fluctuation in the LED load, a fluctuation in the power supply voltage, or the like. A dimmer control leakage pull down using main power device in a flyback converter may be a configuration in which a secondary-side current may be predicted from a switching duty signal and a peak current transmitted from the primary side to the secondary side, and the peak of the secondary-side current may be compared with a power supply voltage to be supplied, thereby controlling an LED current regardless of a fluctuation in an LED load or a fluctuation in power.

However, in an isolation-type LED lamp driver circuit based on a flyback converter of the related art, it may be necessary to provide an additional secondary-side current sensor circuit and an isolation element, such as an opto-coupler. For this reason, there may be a problem in that the whole system increases in volume, and manufacturing costs may be difficult to minimize. From cost reduction viewpoint of the system, it may be necessary to control the secondary-side current with no additional circuit in the isolated flyback converter.

There may be a demand for a technique for controlling a current with no secondary-side additional circuit and a function of shaping the secondary-side current in tune with an input voltage to minimize a phase difference and to maximize a power factor. There may also be demand for a function of controlling illuminance to correspond to a firing angle control-type dimmer.

SUMMARY

Embodiments may provide an isolated flyback converter for an LED driver that may be capable of maximizing a power factor, changing brightness through line firing angle control, and/or controlling relatively stably a secondary-side current without additional circuit on a secondary side regardless of fluctuation in power or fluctuation in load.

In accordance with embodiments, an isolated flyback converter for an LED driver may include at least one of: (1) A snubber circuit connected to the primary side of a transformer to prevent overvoltage or overcurrent. (2) A snubber voltage detection unit which may detect a snubber voltage of the snubber circuit unit and/or may generate a reference voltage proportional to the detected snubber voltage. (3) A switching unit which may have a source terminal connected to a switching current sensing resistor and a drain terminal connected to the snubber circuit unit and may be turned on or off in response to an arbitrary logic signal. (4) A control unit which may compare a voltage supplied through the switching current sensing resistor with the reference voltage supplied through the snubber voltage detection unit and may supply a logic signal at a relatively high level or relatively low level in accordance with the comparison result to the switching unit to control the switching unit such that a secondary-side current of the transformer is maintained relatively constant.

The control unit may perform critical conduction mode control such that the switching unit may be turned on to maximize an inductor current of the transformer and the switching unit may then be turned off to minimize the inductor current of the transformer to 0 A.

The control unit may include a critical conduction mode timing generator which may generate a set signal when the inductor current of the transformer may be 0 A, a comparator which may compare the voltage supplied through the switching current sensing resistor with the reference voltage, and may output a logic signal according to the comparison result. The control unit may include a latch circuit which may set or reset in response to the logic signal of the comparator to generate an output signal at relatively high level or relatively low level.

The snubber voltage detection unit may include a first resistor and a second resistor, and may detect a voltage of a snubber capacitor of the snubber circuit unit. The snubber voltage may be expressed by the following equation.

$$Vsn=Vsup+N\cdot VF$$

In the above equation, Vsup is a power supply voltage supplied to the LED driver, and VF is a secondary-side voltage of the transformer.

The reference voltage may be expressed by the following equation.

$$Vref = \frac{R1}{R1+R2}(V\,sup + N \cdot VF) = K1 \cdot (V\,sup + N \cdot VF)$$

In the above equation, R1 is a resistance of the first resistor R2 is the resistance of the second resistor, Vsup is a power supply voltage supplied to the LED driver, and VF is a secondary-side voltage of the transformer.

The secondary-side current of the transformer may be expressed by the following mathematical equation.

$$ILED = 0.5 \times N \cdot K1 \cdot \frac{Vsup}{Rcs}$$

In the above equation, Vsup is power supply voltage supplied to the LED driver and Rcs is resistance of the switching current sensing resistor.

In accordance with embodiments, an isolated flyback converter for an LED driver may include at least one of: (1) A snubber circuit unit which may be connected to the primary side of a transformer to prevent overvoltage or overcurrent. (2) A snubber voltage detection unit which may detect a snubber voltage of the snubber circuit unit and may generate a voltage proportional to the detected snubber voltage. (3) A switching unit which may have a source terminal connected to a switching current sensing resistor and a drain terminal may be connected to the snubber circuit unit and may be turned on or off in response to an arbitrary logic signal. (4) A peak voltage adjustment unit which may detect a peak voltage of an input power supply voltage and may output a line peak voltage inversely proportional to the peak voltage. (5) A multiplier which may multiply a voltage inversely proportional to the line peak voltage output through the peak voltage adjustment unit and a voltage proportional to the snubber voltage may generate a reference voltage. (6) A control unit which may compare the voltage supplied through the switching current sensing resistor with the reference voltage supplied through the multiplier and supplies a logic signal at relatively high level or relatively low level in accordance with the comparison result to the switching unit which may control the switching unit such that a secondary-side current of the transformer may be maintained relatively constant.

The control unit may perform critical conduction mode control such that the switching unit may be turned on to maximize an inductor current of the transformer and the switching unit may then be turned off to minimize the inductor current of the transformer to 0 A.

In embodiments, the peak voltage adjustment unit may include at least one of: (1) A peak voltage detector which may detect the line peak voltage and may supply the line peak voltage to the multiplier. (2) A multiplier which may multiply the line peak voltage supplied from the peak voltage detector and a feedback output voltage. (3) A feedback amplifier which may supply an amplified output in response to an output of the multiplier.

An output of the peak voltage adjustment unit may be expressed by the following equation.

$$Av = \frac{Vref1}{K2 \cdot V\,sup,\,pk}$$

In the equation above, Vsup,pk is the line peak voltage, and Vref1 is a reference voltage of the peak voltage adjustment unit.

The reference voltage may be expressed by the following equation.

$$Vref = Vref1 \cdot \frac{K1}{K2} \cdot \frac{V\,sup + N \cdot VF}{V\,sup,\,pk}$$

In the equation above, Vsup is a power supply voltage supplied to the LED driver, VF is a secondary-side voltage of the transformer, Vsup,pk is the line peak voltage, and Vref1 is a reference voltage of the peak voltage adjustment unit.

The secondary-side current of the transformer may be expressed by the following equation.

$$ILED = 0.5 \times N \cdot \frac{K1}{K2} \cdot \frac{Vref1}{Rcs} \cdot |\sin\phi|$$

In the equation above, Rcs is resistance of the switching current sensing resistor, Vref1 is a reference voltage of the peak voltage adjustment unit, and $|\sin\phi|$ is a value obtained by dividing the power supply voltage by the line peak voltage.

The control unit may include a critical conduction mode timing generator which may generate a set signal when an inductor current of the transformer is 0 A, a comparator which may compare the voltage supplied through the switching current sensing resistor with the reference voltage, and may output a logic signal according to the comparison result, and a latch circuit which may be set or reset in response to the logic signal of the comparator to generate an output signal at relatively high level or relatively low level.

The snubber voltage detection unit may include a first resistor and a second resistor, and may detect a voltage of a snubber capacitor of the snubber circuit unit.

In accordance with embodiments, an isolated flyback converter for an LED driver may include at least one of: (1) A snubber circuit unit which may be connected to the primary side of a transformer to prevent overvoltage or overcurrent. (2) A snubber voltage detection unit which may detect a snubber voltage of the snubber circuit unit and may generate a voltage proportional to the detected snubber voltage. (3) A switching unit which may have a source terminal connected to a switching current sensing resistor and a drain terminal may be connected to the snubber circuit unit and may be turned on or off in response to an arbitrary logic signal. (4) An average voltage adjustment unit which may detect an average voltage of an input power supply voltage and may output a line average voltage inversely proportional to the average voltage. (5) A multiplier which may multiply a voltage inversely proportional to the line average voltage output through the average voltage adjustment unit and a voltage proportional to the snubber voltage to generate a reference voltage. (6) A control unit which may compare the voltage supplied through the switching current sensing resistor with the reference voltage supplied through the multiplier and may supply a logic signal at relatively high level or relatively low level in accordance with the comparison result to the switching unit to control the switching unit such that a secondary-side current of the transformer is maintained relatively constant.

The control unit may perform critical conduction mode control such that the switching unit may be turned on to maximize an inductor current of the transformer and the switching unit may be turned off to minimize the inductor current of the transformer to 0 A.

The average voltage adjustment unit may include an average voltage detector which may detect the line average voltage and may supply the line average voltage to the multiplier, a multiplier which may multiply the line average voltage supplied from the average voltage detector and a feedback output voltage, and a feedback amplifier which may supply an amplifier output in response to an output of the multiplier.

In accordance with embodiments, it may be possible to control the driving of an LED with no current sensor or isolation element, such as an opto-coupler, in an isolation-type LED driver circuit regardless of a fluctuation in an LED load or a fluctuation in the magnitude of a power supply voltage, to maximize a power factor of an LED driver circuit, and to change brightness through line firing angle control.

DRAWINGS

The above and other features of embodiments may become apparent from the following description given in conjunction with the accompanying drawings, in which.

DESCRIPTION

Embodiments will be described herein, including the best mode known to the inventors for carrying out embodiments. Variations of those embodiments may become apparent to those of ordinary skill in the art upon reading the foregoing description. The inventors expect skilled artisans to employ such variations as appropriate, and the inventors intend for embodiments to be practiced otherwise than as specifically described herein. Accordingly, embodiments may include all modifications and equivalents of the subject matter recited in the claims appended hereto as permitted by applicable law. Moreover, any combination of the above-described elements in all possible variations thereof is encompassed by embodiments unless otherwise indicated herein or otherwise clearly contradicted by context.

In the following description of embodiments, if the detailed description of the already known structure and operation may confuse the subject matter of embodiments, the detailed description thereof will be omitted. The following terms are terminologies defined by considering functions of embodiments and may be changed as operators intend for embodiments and practice. Hence, the terms should be defined throughout the description of embodiments.

Embodiments may be to implement an LED driver and an isolated flyback converter capable of controlling the driving of an LED without being affected by a fluctuation in an LED load or a fluctuation in the magnitude of power supply voltage with no current sensor or isolation element, such as an opto-coupler, in an isolation-type LED driver circuit, maximizing a power factor of the LED driver circuit, and changing brightness through line firing angle control. From this technical spirit, the objects of embodiments may be achieved.

To understand embodiments, it is necessary to analyze a relational equation relating to a secondary-side current of a flyback converter based on critical conduction mode (CRM) control.

The critical conduction mode control means that the current of an inductor Lm may maximize from 0 A when a switch is turned on during a switching cycle, minimize after the switch is turned off, and becomes 0 A when the switching cycle ends. This operation is called a critical conduction mode operation because the current of the inductor operates at the boundary between a continuous conduction mode and a discontinuous conduction mode.

Figure 1:
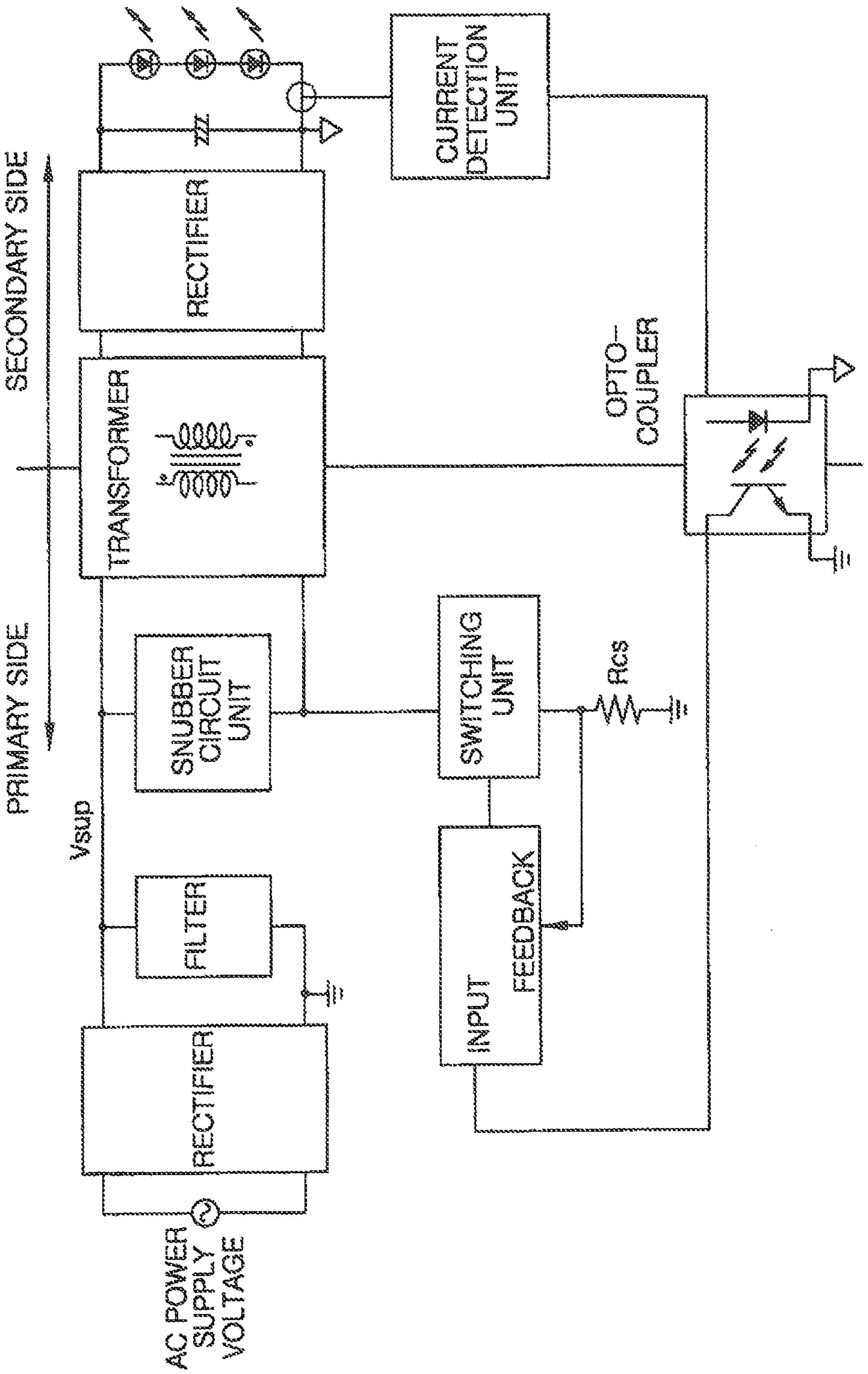
FIG. 1 (RELATED ART)
FIG. 1 is a block configuration diagram illustrating an isolation-type LED driver, in accordance with the related art.
Figure 2:
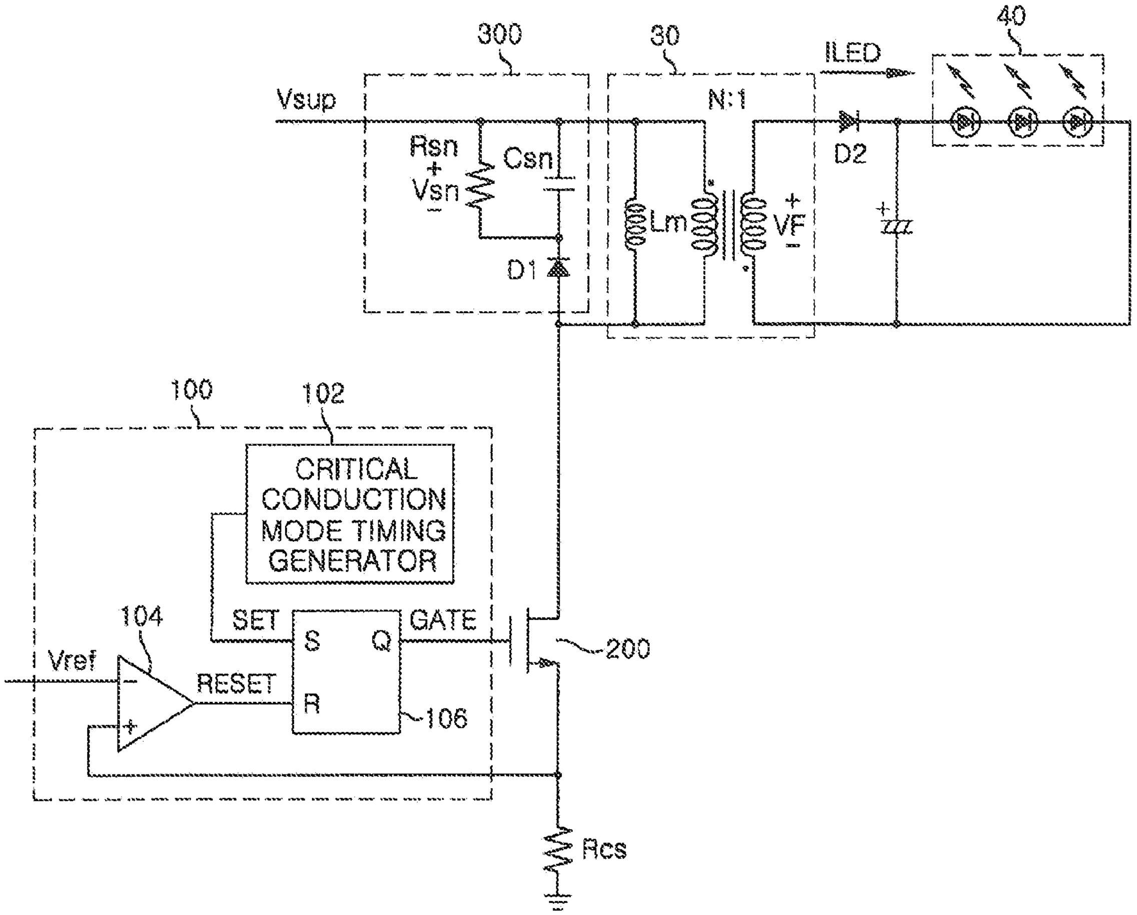
FIG. 2 is a configuration diagram illustrating a critical conduction mode control-type flyback converter, in accordance with embodiments.

FIG. 2 illustrates a critical conduction mode flyback converter, in accordance with embodiments. In embodiments, the critical conduction mode flyback converter may include a control unit 100, a critical conduction mode timing generator 102, a comparator 104, a latch circuit 106 in the control unit 100, a switching unit 200, a snubber circuit unit 300, a transformer 30, and an LED load 40.

Referring to FIG. 2, the critical conduction mode timing generator 102 of the control unit 100 may be, for example, a circuit which applies a set signal to the latch circuit 106 when the current of the inductor minimizes to 0 and may set a gate signal of the latch circuit 106 in a high state. The configuration of the critical conduction mode timing generator 102 may be well known and in a general form, and detailed description thereof will not be provided.

The switching unit 200 may be constituted by, for example, an MOSFET (Metal Oxide Semiconductor Field Effect Transistor) or the like, and may be turned on or off when the gate signal of the latch circuit 106 may be in the relatively high or relatively low state. A resistor Rcs which senses a switching current may be connected to the switching unit 200.

The snubber circuit unit 300 is a kind of protection circuit, and may include, for example, an overvoltage prevention circuit or an overcurrent prevention circuit. The snubber circuit unit 300 may include a snubber resistor Rsn, a snubber capacitor Csn, and a diode D1.

Figure 3:
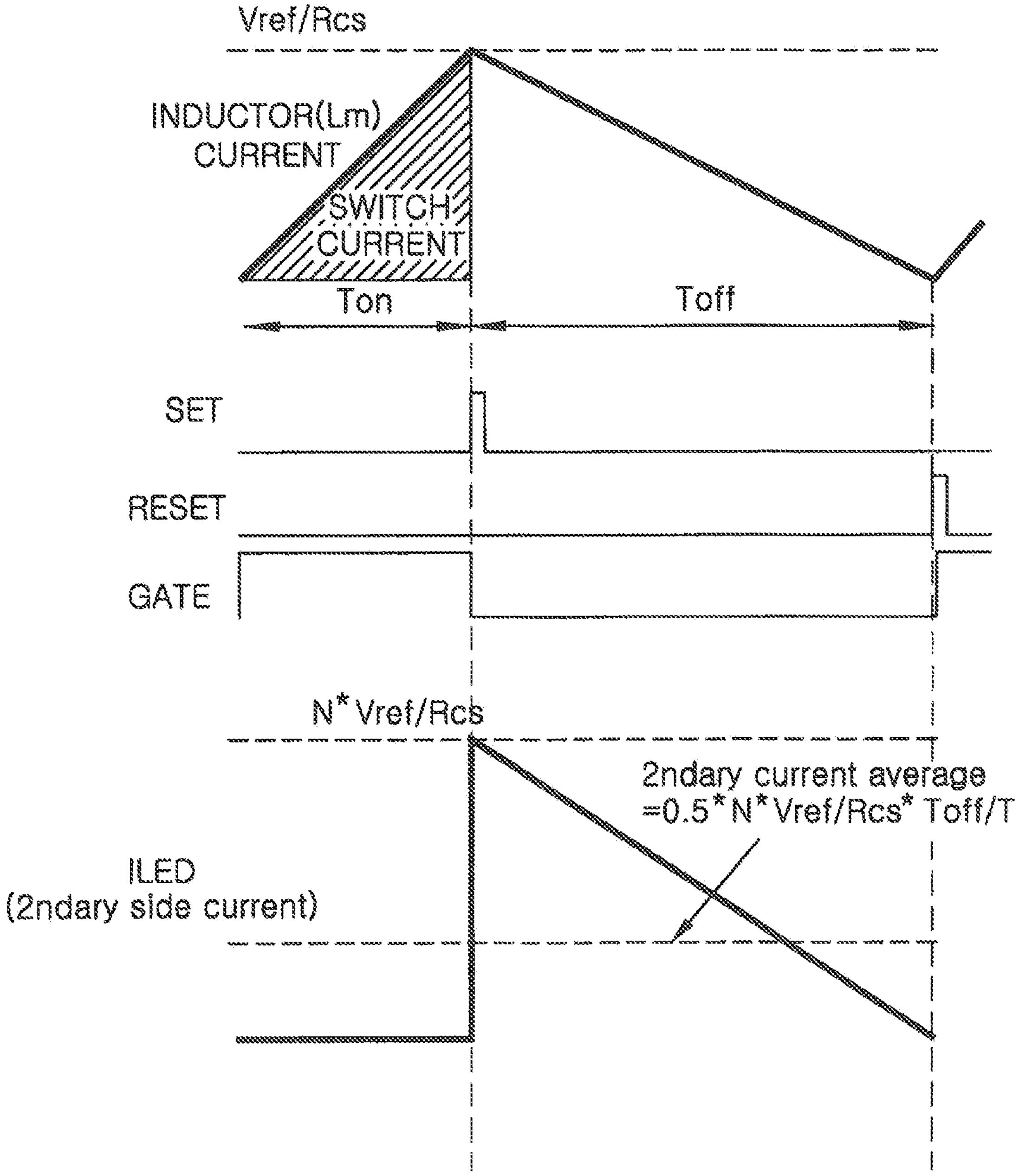
FIG. 3 is a waveform chart illustrating an inductor current and a secondary-side current of a transformer in the flyback converter of FIG. 2, in accordance with embodiments.

FIG. 3 is a waveform chart showing an inductor current and a secondary-side current of a transformer in the flyback converter of FIG. 2, in accordance with embodiments. The operation of the flyback converter will be described with reference to FIG. 3.

Since the flyback converter of FIG. 2 performs the critical conduction mode operation, it may be assumed that an initial current value of the inductor Lm is 0. At this time, as shown in FIG. 3, for the period Ton of time for which the switching unit 200 may be turned on, the current of the inductor Lm may be maximized, and a current value I(t) at this time is determined by Equation 1.

$$I(t) = \frac{V\,sup}{Lm}t$$ [Equation 1]

Since the current during the period Ton of time for which the switching unit 200 is turned on may be equal to the current of the inductor, the current of the inductor may flow in Rcs. If this current is converted to a voltage by Rcs and this voltage becomes equal to a reference voltage Vref, an output of the comparator 104 may be in the relatively high state to generate a reset signal.

For this reason, an output of the latch circuit 106 is in the relatively low state, and as shown in FIG. 3, the gate signal may be in the relatively low state. Then, the switching unit 200 may be turned off, and the inductor current may not maximize anymore.

Accordingly, the time until the maximum value of the inductor current becomes Vref/Rcs is Ton for which the switching unit 200 may be turned on. Ton is expressed by Equation 2.

$$Ton = \frac{Lm}{Vsup} \cdot \frac{Vref}{Rcs}.$$ [Equation 2]

After Ton, the switching unit 200 may be turned off, and the inductor current may be transmitted to the secondary side through the transformer 30. Accordingly, as shown in FIG. 3, the inductor current may minimize to 0.

An inductor current minimization rate is determined by a voltage across both ends of the inductor, as in Equation 1.

If the switching unit 200 is turned off, energy of the inductor may be transferred to the secondary side of the transformer 30, and electrical conduction may be provided to a secondary-side rectifying diode, thereby forming a current path. At this time, a secondary-side voltage of the transformer 30 may become VF which is a voltage of the LED load 40. When viewed from the primary side of the transformer 30, the secondary-side voltage may become N times by a winding ratio N:1 between the primary side and the secondary side, and a current decrease slope may be determined by N*VF/Lm.

Accordingly, Toff, the time until the inductor current may minimize to 0 may be expressed by Equation 3.

$$Toff = \frac{Lm}{N \cdot VF} \cdot \frac{Vref}{Rcs}$$ [Equation 3]

Ton is the time for which the switching unit 200 is turned on, and Toff is the time for which the switching unit 200 is turned off. Accordingly, the total time of Ton and Toff becomes the switching cycle T of the switching unit 200.

As shown in FIG. 3, the secondary-side current is N times greater than the primary-side inductor current for the period Toff of time. Accordingly, an LED average current in one cycle is predicted as in Equation 4.

$$ILED = 0.5 \times N \cdot \frac{Vref}{Rcs} \cdot \frac{Toff}{Ton + Toff}$$ [Equation 4]

If the results of Equations 2 and 3 are substituted in Equation 4, the LED average current in one cycle is expressed by Equation 5.

$$ILED = 0.5 \times N \cdot \frac{Vref}{Rcs} \cdot \frac{Vsup}{Vsup + N \cdot VF}$$ [Equation 5]

It may be apparent from Equation 5 that an average current ILED of the LED load in one cycle may differ depending on an input voltage Vsup and a voltage VF of the LED load, the average current ILED depends on a line and a load. For this reason, line and load regulation characteristics may be degraded.

Accordingly, it is necessary to maximize the line and load regulation characteristics. Embodiments for implementing the improvement will be described in detail with reference to the accompanying drawings.

Figure 4:
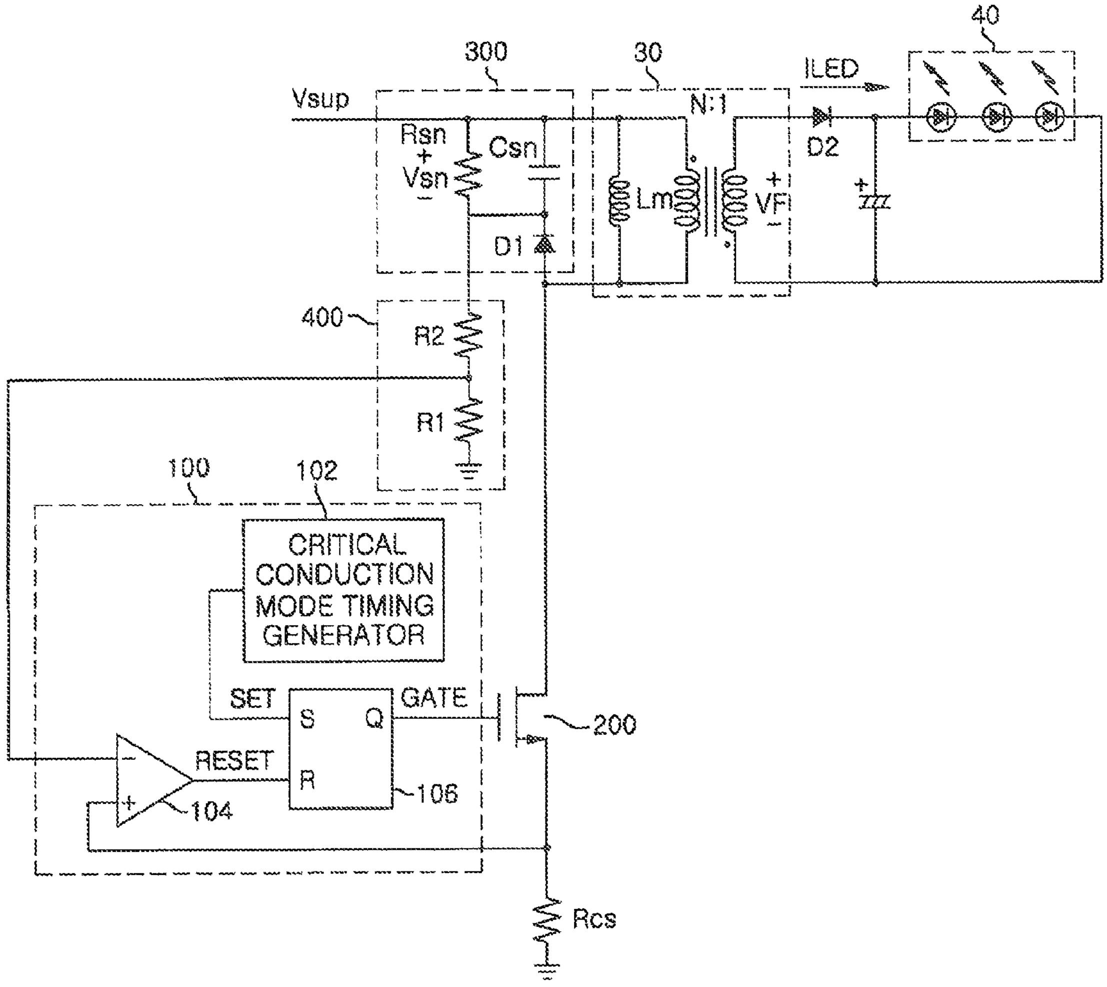
FIG. 4 is a configuration diagram illustrating an isolated flyback converter, in accordance with embodiments.

FIG. 4 is a configuration diagram showing an isolated flyback converter, in accordance with embodiments. The isolated flyback converter may include a control unit 100, a switching unit 200, a snubber circuit unit 300, a snubber voltage detection unit 400, a transformer 30, and an LED load 40.

As shown in FIG. 4, the control unit 100 may include a critical conduction mode timing generator 102, a comparator 104, and a latch circuit 106. The critical conduction mode timing generator 102 may be a circuit which may apply a set signal to the latch circuit 106 when the current of the inductor minimizes to 0 and sets the gate signal of the latch circuit 106 in the relatively high state. The configuration of the critical conduction mode timing generator 102 may be well known and in a general form, and detailed description thereof will not be provided.

The comparator 104 may compare a voltage supplied through a switching current sensing resistor Res and the reference voltage Vref, and may output a logic signal according to the comparison result.

The latch circuit 106 may be reset in response to an output signal of the comparator 104, which may be a relatively high signal and in the output state may be at relatively low level, and may be set in response to an output signal of the critical conduction mode timing generator 102 and in the output state at relatively high level to apply the gate input signal at relatively high level or relatively low level to the switching unit 200.

The switching unit 200 may be constituted by a MOSFET or similar device. The switching unit 200 may have a gate terminal connected to the latch circuit 106 and may be turned on or off as a gate input signal of the latch circuit 106 may be in the relatively high or relatively low state. The switching unit 200 may have a source terminal connected to the resistor Rcs which may sense a switching current and a drain connected to the snubber circuit unit 300.

The snubber circuit unit 300 is a kind of protection circuit, and may include, for example, an overvoltage prevention circuit or an overcurrent prevention circuit. The snubber circuit unit 300 may include a snubber resistor Rsn, a snubber capacitor Csn, and a diode D1, and may be connected to the drain terminal of the switching unit 200.

The snubber voltage detection unit 400 may include a first resistor R1 and a second resistor R2. The snubber voltage detection unit 400 may detect a voltage in the snubber capacitor Csn of the snubber circuit unit 300 and may supply the reference voltage Vref proportional to Vsup+N*VF to the comparator 104 of the control unit 100.

As described above, during the period of time for which the switching unit 200 may be turned off, in the transformer 30, the secondary-side voltage of the transformer 30 may maximize by the winding ratio N of the transformer 30 and may be reflected in the primary side. Accordingly, a voltage corresponding to N*VF may be applied across both ends of the inductor Lm. If there is no leakage inductance in the transformer 30, the diode D1 is turned on, such that the snubber capacitor Csn may be charged with the voltage N*VF.

Therefore, as shown in FIG. 4, if the voltage in the snubber capacitor Csn is detected by R1 and R2, a voltage proportional to Vsup+N*VF may be obtained.

As described above, the snubber voltage Vsn is expressed by Equation 6.

$$Vsn = Vsup + N \cdot VF \quad \text{[Equation 6]}$$

Since a voltage attenuated from the voltage Vsn by R1 and R2 is Vref, Vref is expressed by Equation 7.

$$Vref = \frac{R1}{R1 + R2}(Vsup + N \cdot VF) = K1 \cdot (Vsup + N \cdot VF) \quad \text{[Equation 7]}$$

If the result of Equation 7 is substituted in Equation 5 described above, the LED average current in one cycle is expressed by Equation 8.

$$ILED = 0.5 \times N \cdot K1 \cdot \frac{Vsup}{Rcs} \quad \text{[Equation 8]}$$

Since the relationship between the LED average current ILED in one cycle and VF is not found, it may be apparent from Equation 8 that it can be understood that a fluctuation in the secondary-side current due to a fluctuation in the LED load 40 may be eliminated.

That is, embodiments of FIG. 4 may be implemented such that the load regulation characteristic may be maximized using the proportional value of the snubber voltage Vsn without being affected by the number of LED loads 40.

Figure 5:
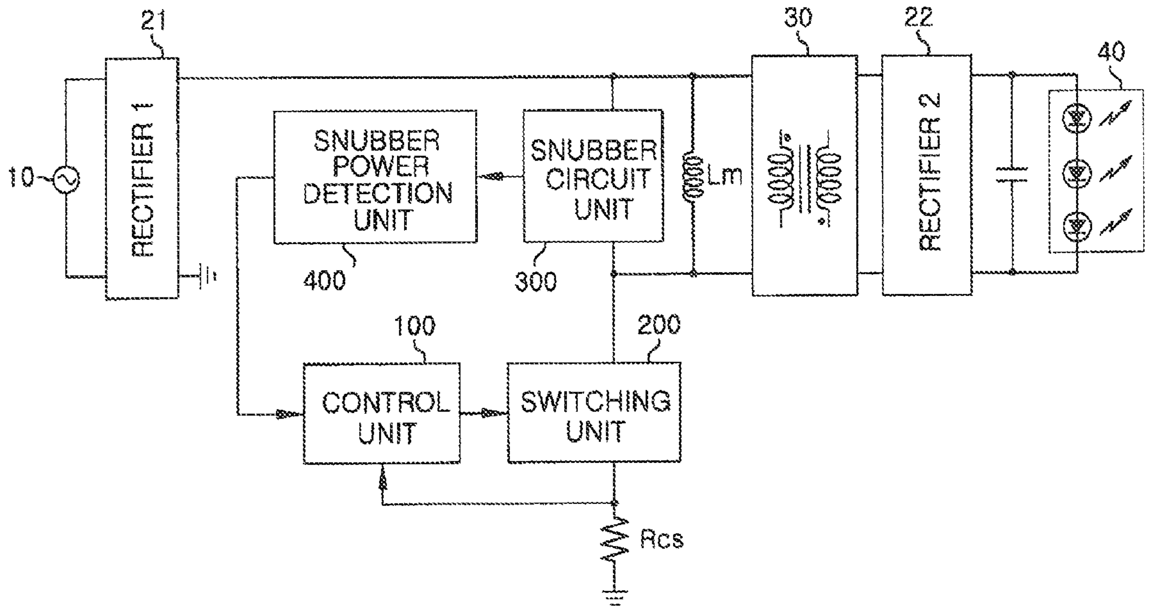
FIG. 5 is a block configuration diagram illustrating an LED driver to which the isolated flyback converter of FIG. 4 may be applied, in accordance with embodiments.

FIG. 5 is a block configuration diagram of an LED driver to which the isolated flyback converter of FIG. 4 may be applied, in accordance with embodiments. The LED driver may include a power supply voltage 10, rectifiers 21 and 22, a transformer 30, and an LED load 40. The LED driver may also include a control unit 100, a switching unit 200, a snubber circuit unit 300, and a snubber voltage detection unit 400.

As shown in FIG. 5, the control unit 100 may compare the voltage supplied through the switching current sensing resistor Rcs with the reference voltage Vref supplied through the snubber voltage detection unit 400 and may supply a relatively high signal or a relatively low signal to the switching unit 200 to turn on/off the switching unit 200. Specifically, the control unit 100 may perform the critical conduction mode operation such that the switching unit 200 may be turned on to maximize the inductor current of transformer 30 from 0 A, and the switching unit 200 may be then turned off to minimize the inductor current to 0 A. Accordingly, when changing the input value of the control unit 100, a peak current of the inductor may be changed through switch control.

The switching unit 200 may be turned on or off in response to the relatively high signal or relatively low signal from the control unit 100. The snubber circuit unit 300 may be a protection circuit, and may include, for example, an overvoltage prevention circuit or an overcurrent prevention circuit.

The snubber voltage detection unit 400 may detect the snubber voltage Vsn of the snubber circuit unit 300 and may apply the reference voltage Vref proportional to Vsup+N*VF to control unit 100. Accordingly, the control unit 100 may compare the voltage supplied through the switching current sensing resistor Res with the reference voltage Vref supplied through the snubber voltage detection unit 400 and may perform the above-described critical conduction mode control, thereby maintaining the secondary-side current of the transformer 30 relatively constant regardless of fluctuation in LED load 40.

Figure 6:
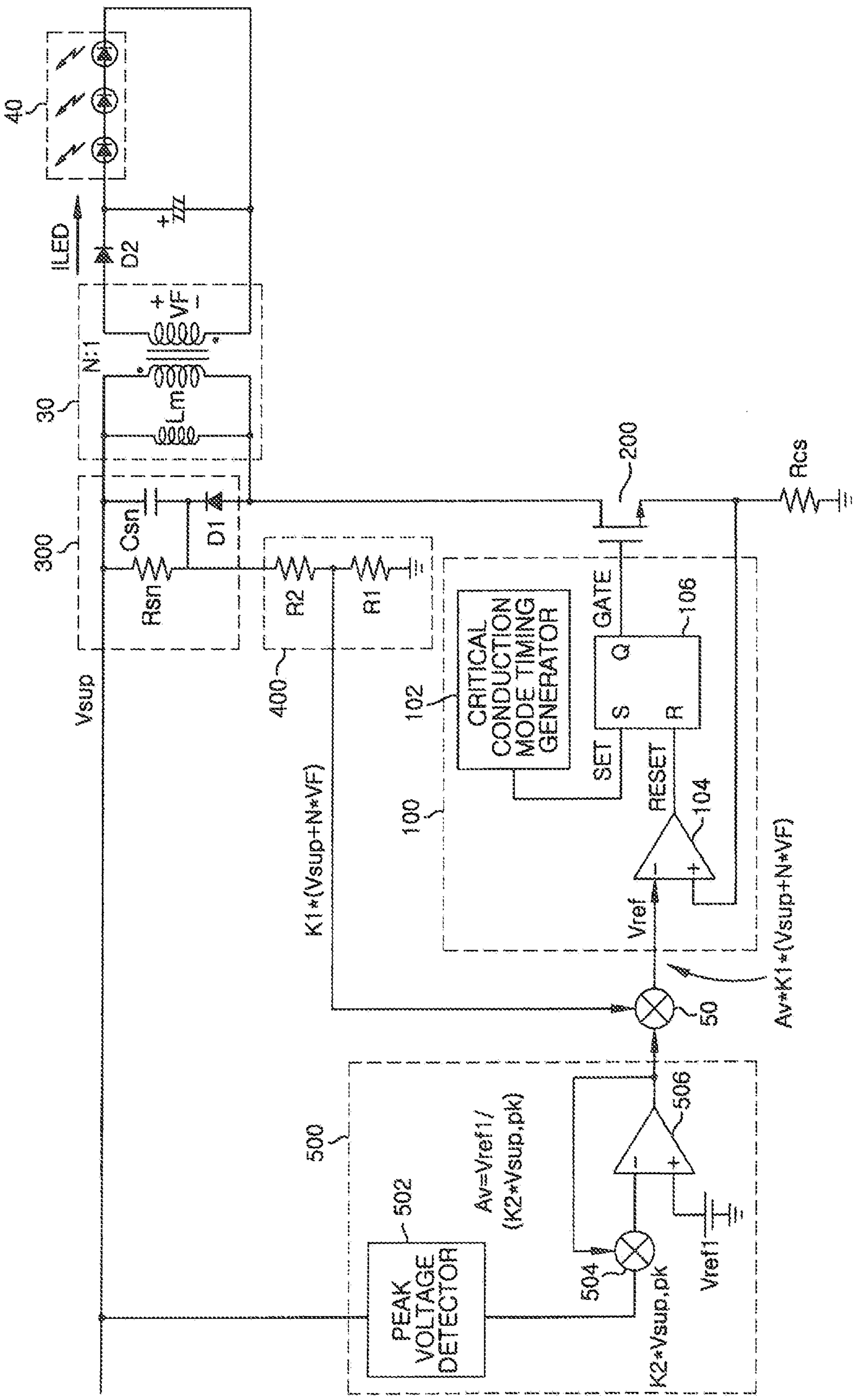
FIG. 6 is a configuration diagram illustrating an isolated flyback converter in accordance embodiments.

FIG. 6 is a configuration diagram showing an isolated flyback converter in accordance with embodiments. FIG. 6 shows a circuit which may maximize the line regulation characteristic as an LED current fluctuation characteristic depending on a fluctuation in an AC voltage.

That is, FIG. 6 shows an isolated flyback converter which may maintain an LED current relatively constant regardless of the magnitude of a power supply voltage (110 V or 220 V), in accordance with embodiments. The isolated flyback converter may further include a voltage adjustment unit 500, in addition to the circuit of FIG. 4.

The following description will be provided focusing on the voltage adjustment unit 500 added to the Circuit of FIG. 4. The same parts as those in FIG. 4 are represented by the same reference numerals, and description thereof will not be repeated.

The voltage adjustment unit 500 may have a function of automatic peak voltage gain control and may include a peak voltage detector 502, a multiplier 504, and a feedback amplifier 506. The peak voltage detector 502 may detect a line peak voltage Vsup,pk which may be a peak voltage of the power supply voltage Vsup and supplies the voltage K2*Vsup,pk to the multiplier 504. The multiplier 504 may multiply the peak voltage K2*Vsup,pk supplied from the peak voltage detector 502 and an output voltage supplied from the feedback amplifier 506 described below. The feedback amplifier 506 may supply an amplifier output Av in response to an output of the multiplier 504. The multiplier 50 may multiply a voltage inversely proportional to the line peak voltage supplied from the voltage adjustment unit 500 and the snubber voltage supplied from the snubber voltage detection unit 400, and may supply the result to the control unit 100. This configuration may be implemented in various forms, and the circuit of FIG. 6 is only for illustration of the concept.

Hereinafter, the operation of embodiments may be described with reference to Equations. Equation 9 is satisfied by the voltage adjustment unit 500 to which negative feedback may be applied. (Although a frequency correction circuit may be provided in an AGC circuit, for simplification of description of embodiments, description of the frequency correction circuit may not be provided.)

$$K2 \cdot Vsup,pk \times Av = Vref1 \quad \text{[Equation 9]}$$

Accordingly, the output Av may have the following value. In Equation 9, Vref1 is a constant reference voltage, and is regarded as a constant. In Equation 9, even when Vsup,pk may change, automatic control may be performed such that the multiplier output in the voltage adjustment unit 500 is approximately maintained to Vref1.

The amplifier output Av of the voltage adjustment unit 500 may be obtained from the above-described circuit operation and Equation 9 as the result of the circuit operation, and by Equation 10.

$$Av = \frac{Vref1}{K2 \cdot Vsup,pk} \quad \text{[Equation 10]}$$

Referring to FIG. 6, the voltage Av generated by the voltage adjustment unit 500 may be multiplied to the detected snubber voltage Vsn, and the resultant value becomes Vref, in accordance with embodiments. Accordingly, Vref may be expressed by Equation 11 from Equation 7 as the detection result of the snubber voltage and Equation 10 as the output result of the voltage adjustment unit 500.

$$Vref = Vref1 \cdot \frac{K1}{K2} \cdot \frac{Vsup + N \cdot VF}{Vsup,\ pk} \quad \text{[Equation 11]}$$

If Equation 11 is substituted in Equation 5 regarding the LED average current in one cycle as per critical conduction mode operation, an equation regarding the LED average current in one cycle, such as Equation 12, is finally obtained.

$$ILED = 0.5N \cdot \frac{K1}{K2} \cdot \frac{Vref1}{Rcs} \cdot \frac{Vsup}{Vsup,\ pk} \quad \text{[Equation 12]}$$

In Equation 12, Vsup is a signal which is full-wave rectified from a sine-wave AC power having the maximum value of Vsup,pk and is expressed by Equation 13.

$$Vsup = Vsup,\ pk \times |\sin \phi| \quad \text{[Equation 13]}$$

In the above equation, $\phi = 2\pi ft$ (where f is frequency, and t is time), and changes from 0 to 180 degrees in a cycle corresponding to two times greater than the frequency of the AC input.

Accordingly, the average current of the LED load 40 may be expressed by Equation 14 as below.

$$ILED = 0.5 \times N \cdot \frac{K1}{K2} \cdot \frac{Vref1}{Rcs} \cdot |\sin\phi| \quad \text{[Equation 14]}$$

The sine term is related to the form of the input voltage, and is thus unrelated to the peak value of the input voltage. In Equation 14, it can be understood that N, K1, K2, Vref1, and Res are determined values and might not be affected by the magnitude of the power supply voltage or the characteristic of the load.

Meanwhile, from the sine term, it can be understood that, as the input voltage may change in a sine wave form, the LED current may change in a sine wave form. In embodiments, this may be a very important characteristic and related to a power factor (hereinafter, referred to as PF).

The PF may be used to measure the phase difference between the AC input voltage and current, and if there is no phase difference between the input voltage and current, PF=1, then this means that there may be no reactive power consumption. When there is no reactive power consumption, power generated by an electric power station is thoroughly consumed by the load, and the efficiency of the electric power station maximizes.

When there is reactive power consumption, the electric power station should supply more power by an amount corresponding to reactive power consumption so that a desired power level may be satisfied in the load. Accordingly, a relatively high PF is very important from the viewpoint of environment-friendly power generation and consumption.

If the efficiency of a converter which drives an LED is relatively high and approaches 100%, the LED current is substantially equal to the current supplied from the AC power supply, and the current of the LED has the same sine wave form as the input. That is, control may be performed such that PF=1 may be approached. Accordingly, it may be possible to minimize reactive power consumption.

As described above, embodiments of FIG. 6 may be implemented in which the LED current is maintained relatively constant without being affected by the number of LED loads regardless of the magnitude of the power supply voltage, thereby maximizing the line regulation characteristic as the LED current fluctuation characteristic.

Figure 7A:
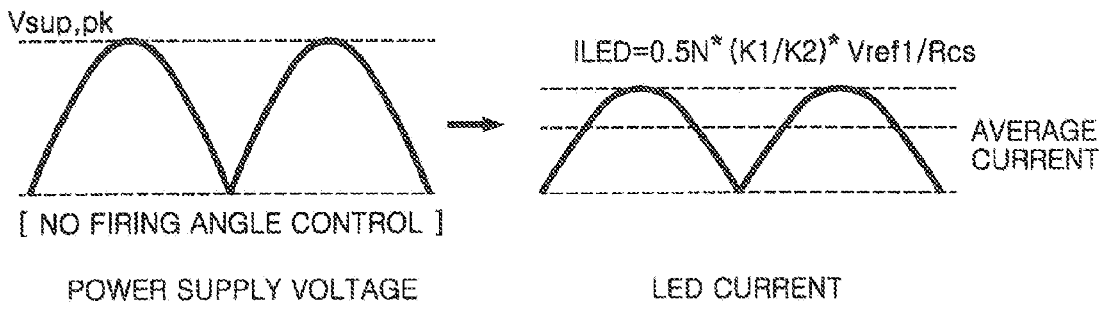
FIGS. 7A to 7C are charts of waveform illustrating changes in a secondary-side output current according to input voltage firing angle control in the isolated flyback converter of FIG. 6, in accordance with embodiments.
Figure 7B:
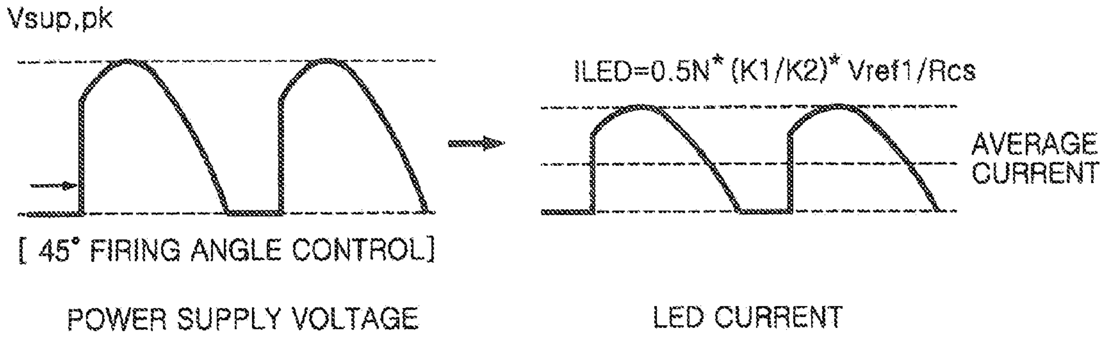
Figure 7C:
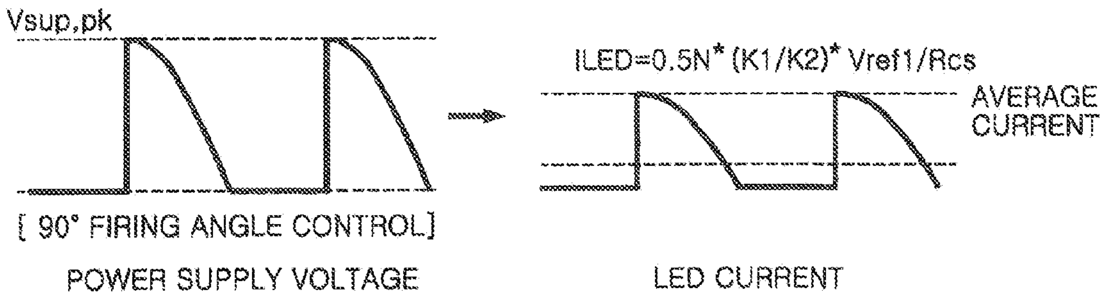

FIGS. 7A to 7C include waveform charts showing changes in a secondary-side output current according to input voltage firing angle control in the isolated flyback converter of FIG. 6, in accordance with embodiments. When an input is assumed to be a sine wave, an LED current is in a sine wave form, as in Equation 14. Meanwhile, as shown in FIGS. 7A to 7C if firing angle control is performed on the power supply using a dimmer, an output current has the same form as an input voltage. This is confirmed from Equation 11, and it is found that the Vsup term is present in the numerator of Equation 11. A change in the power supply voltage Vsup may affect a change in the reference voltage, and as a result, the peak current of the inductor follows the form of the power supply voltage Vsup.

As described above, since the secondary-side current changes in the magnitude depending on the peak voltage of the inductor, it may be predicted that the LED current changes depending on the input voltage Vsup. With the above-described operation characteristic, it may be possible to change the LED average current in accordance with the firing angle.

As shown in FIG. 7A, when firing angle control is not performed, the maximum average value is obtained. Further, as shown in FIGS. 7A and 7B, as the firing angle increases to 45 degrees and 90 degrees, the amount of power to be supplied gradually minimizes, such that the LED average current also minimizes.

In accordance with embodiments, control is performed such that the LED current may follow the form of the input power supply voltage, making it possible to perform brightness control (dimming) through firing angle control.

Figure 8:
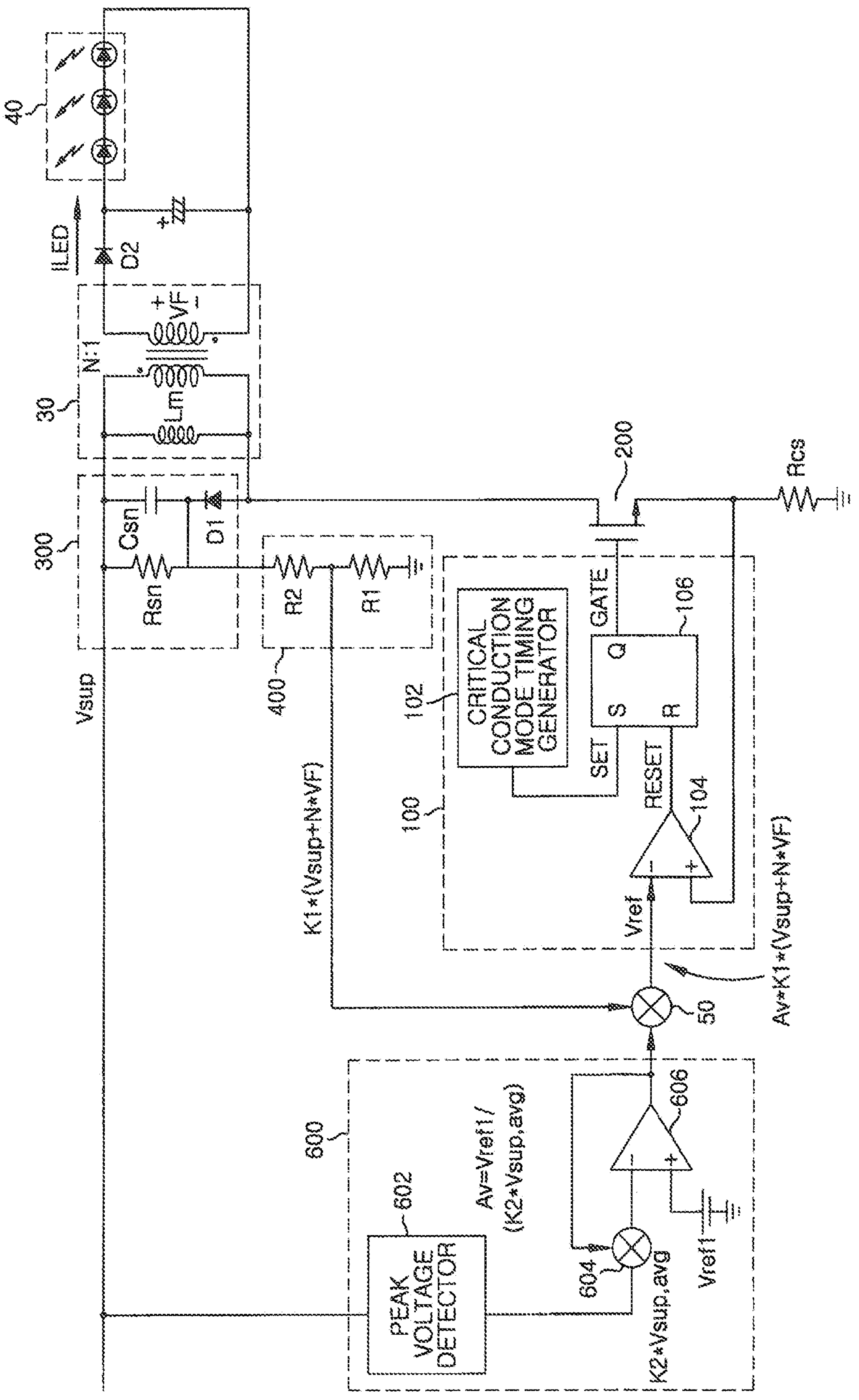
FIG. 8 is a configuration diagram illustrating an isolated flyback converter, in accordance with embodiments.

FIG. 8 is a configuration diagram showing an isolated flyback converter in accordance with embodiments. FIG. 8 shows a case where the voltage adjustment unit 500 of FIG. 6 may generate a signal inversely proportional to the line average voltage. In some designs, critical conduction mode control is performed using the proportional value of the snubber voltage and the inversely proportional value of the line average voltage, thereby maintaining the average current of the LED load 40 without being affected by the number of LED loads 40 and the magnitude of the power supply voltage regardless of fluctuation in the peak voltage.

As shown in FIG. 8, the voltage adjustment unit 500 of FIG. 6 may have an average voltage detection function which may detect an average value of an input power supply voltage, instead of a peak detection function. Only when line firing angle control may not be performed, control may be performed such that, even when the line peak voltage fluctuates, a relatively constant LED current flows.

Control may be performed substantially in the same manner designs where the peak detection function may be used. Meanwhile, current control through line fining angle control may not be performed due to a process for obtaining an average. Accordingly, this method may be used when firing angle control may not be performed.

LED driver connected to the isolated flyback converter of FIG. 8 is the same as shown in FIG. 6, except that the voltage adjustment unit 500 has a function of detecting an average voltage, and thus description thereof will not be repeated.

Embodiments have at least one of the following characteristics: (1) Control is performed such that the LED current may be relatively constant regardless of fluctuation in the power supply voltage. (2) Control may be performed such that the LED current may be relatively constant regardless of fluctuation in the load. (3) LED current may be generated in the same form as the input power supply voltage to maximize the power factor. (4) When a peak-type AGC circuit may be used, brightness control may be performed through line firing angle control.

Figure 9A:
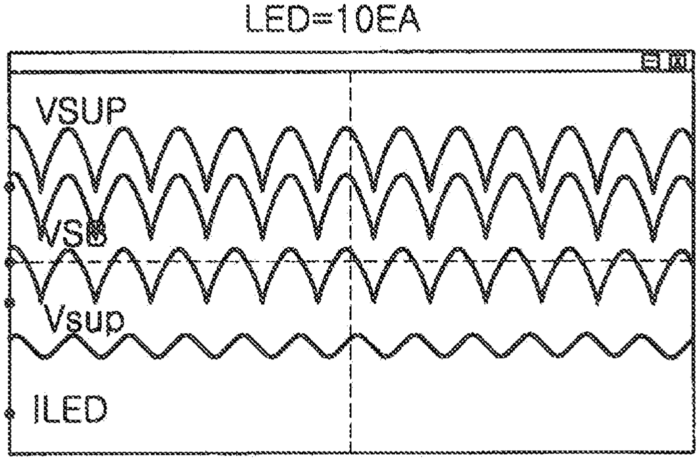
FIGS. 9 and 10 are waveform charts illustrating an example where an average current of an LED is maintained relatively constant when the number of LED loads varies, in accordance with embodiments.
Figure 9B:
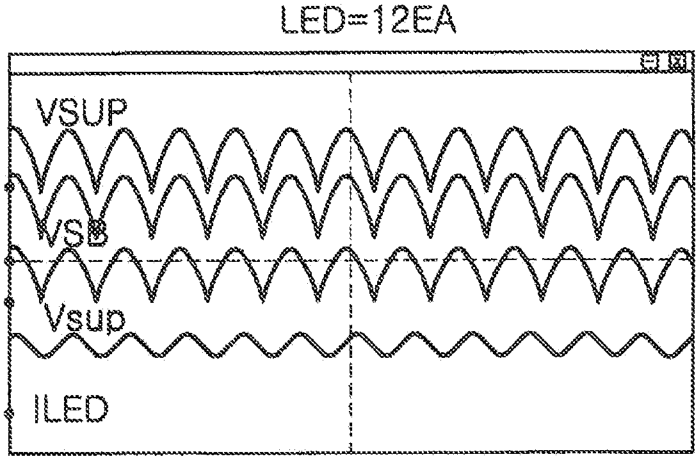
Figure 10:
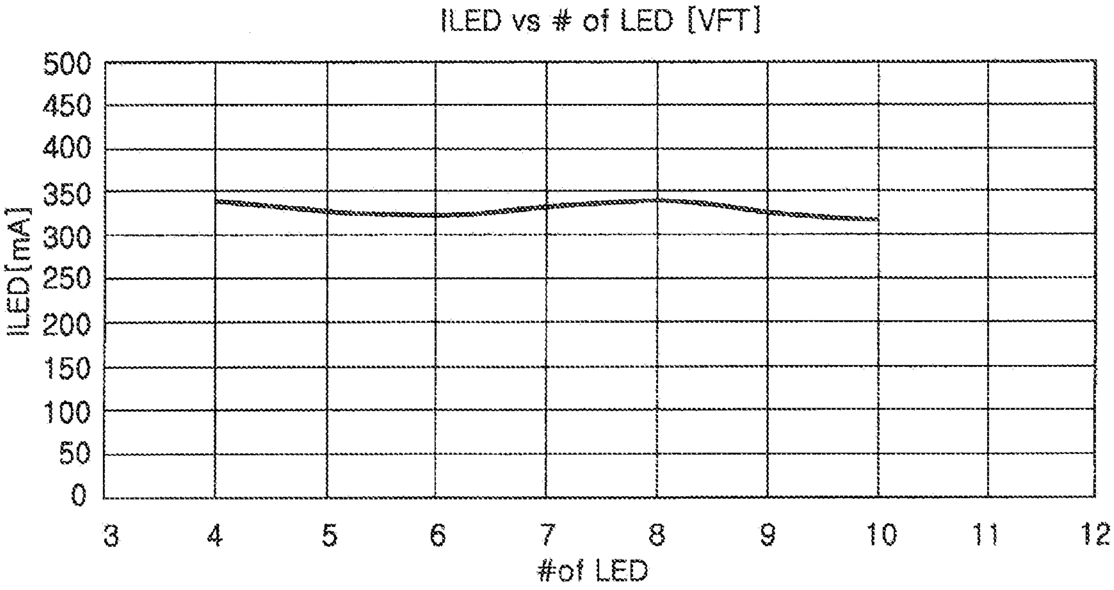

FIGS. 9A and 9B are waveform charts showing an example where an LED average current may be maintained relatively constant when the number of LED loads varies, in accordance with embodiments. FIG. 10 is a graph through which a fluctuation in the LED current may be confirmed in some designs.

FIGS. 9A and 9B show current test waveform results when 10 and 12 LEDs are driven, respectively. In both cases, it may be confirmed that the LED average current ILED may be substantially controlled relatively constant.

FIG. 10 is a graph showing a fluctuation in the LED current when the number of LEDs is changed from 4 to 10 at 220 V (AC), in accordance with embodiments. It can be understood that, even when the number of LEDs change, the LED average current may be substantially maintained relatively constant.

Figure 11A:
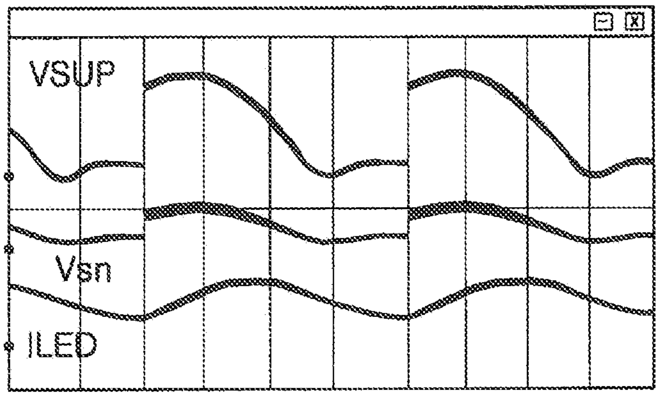
FIGS. 11A and 11B are waveform charts illustrating changes in an LED current under phase control, in accordance with embodiments.
Figure 11B:
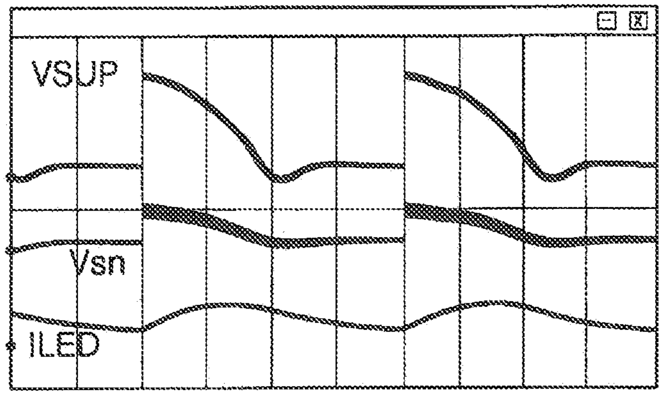

FIGS. 11A and 11B are waveform charts illustrating changes in the LED current relative to phase control, in accordance with embodiments. FIGS. 11A and 11B show test values when firing angle control is performed at a firing angle of 60 degrees and 90 degrees with respect to the power supply voltage Vsup, respectively.

As shown in FIGS. 11A and 11B, it can be understood that the snubber voltage Vsn changes in the same form as the power supply voltage Vsup. Since a larger amount of energy is applied when the firing angle is 60 degrees, a larger amount, of current should flow in the LED.

Referring to FIG. 10, it can be understood that the LED current minimizes more in the right view than in the left view, and it can be thus confirmed that brightness control (dimming) may be performed through firing angle control, in accordance with embodiments. The reason for which the LED current ILED is a different form from the power supply voltage Vsup is that, as shown in FIG. 6, the capacitor may be connected to both ends of the LED to smooth the LED current.

In accordance with embodiments, implementation of the LED driver and the isolated flyback converter controls the driving of the LED without being affected by fluctuation in the LED load or fluctuation in the magnitude of the power supply voltage with no current sensor or isolation element, such as an opto-coupler, in the isolation-type LED driver circuit. This results in maximization of the power factor of the LED driver circuit, changing brightness through line firing angle control, and stably controlling the secondary-side current without additional circuit on the secondary side regardless of fluctuation in power or fluctuation in load. It will be obvious and apparent to those skilled in the art that various modifications and variations can be made in embodiments disclosed. Thus, it is intended that the disclosed embodiments cover the obvious and apparent modifications and variations, provided that they are within the scope of the appended claims and their equivalents.

What is claimed is:

1. An isolated flyback converter for an LED driver comprising:

a snubber circuit unit connected to the primary side of a transformer and configured to substantially prevent at least one of overvoltage and overcurrent;

a snubber voltage detection unit configured to at least one of detects a snubber voltage of the snubber circuit unit and generates a reference voltage proportional to the detected snubber voltage;

a switching unit with a source terminal connected to at least one of a switching current sensing resistor and a drain terminal connected to the snubber circuit unit, wherein the switching unit is turned on or off in response to an arbitrary logic signal; and a control unit configured to compares voltage supplied through the switching current sensing resistor with the reference voltage supplied through the snubber voltage detection unit, wherein the control unit is configured to supply a logic signal at a relatively high level or a relatively low level in accordance with the comparison result to the switching unit to control the switching unit such that a secondary-side current of the transformer is maintained relatively constant.

2. The isolated flyback converter of claim 1, wherein the control unit is configured to perform critical conduction mode control such that the switching unit is turned on to maximize an inductor current of the transformer and the switching unit is then turned off to minimize the inductor current of the transformer to 0 A.

3. The isolated flyback converter of claim 2, wherein the control unit comprises:

a critical conduction mode timing generator configured to generate a set signal when the inductor current of the transformer is 0 A;

a comparator which compares the voltage supplied through the switching current sensing resistor with the reference voltage, wherein the comparator is configured to output a logic signal according to acomparison result; and a latch circuit configured is set or reset in response to the logic signal of the comparator to generate an output signal at high level or low level.

4. The isolated flyback converter of claim 1, wherein the snubber voltage detection unit comprises a first resistor and a second resistor and is configured to detect a voltage of a snubber capacitor of the snubber circuit unit.

5. The isolated flyback converter of claim 4, wherein the snubber voltage is expressed by the following equation $$Vsn=Vsup+N\cdot VF$$

,wherein Vsup is a power supply voltage supplied to the LED driver and VF is a secondary-side voltage of the transformer.

6. The isolated flyback converter of claim 4, wherein the reference voltage is expressed by the following equation $$Vref=\frac{R1}{R1+R2}(Vsup+N\cdot VF)=K1\cdot(Vsup+N\cdot VF),$$

wherein R1 is resistance of the first resistor, R2 is resistance of the second resistor, Vsup is power supply voltage supplied to the LED driver, and VF is secondary-side voltage of the transformer.

7. The isolated flyback converter of claim 1, wherein the secondary-side current of the transformer is expressed by a equation $$ILED=0.5\times N\cdot K1\cdot\frac{Vsup}{Rcs},$$

wherein Vsup is power supply voltage supplied to the LED driver and Rcs is resistance of the switching current sensing resistor.

8. An isolated flyback converter for an LED driver comprising:

a snubber circuit unit connected to the primary side of a transformer configured to substantially prevent overvoltage or overcurrent;

a snubber voltage detection unit configured to detect a snubber voltage of the snubber circuit unit and generate a voltage proportional to the detected snubber voltage;

a switching unit wherein at least one of a source terminal is connected to a switching current sensing resistor and a drain terminal is connected to the snubber circuit unit, wherein the switching unit is turned on or off in response to an arbitrary logic signal;

a peak voltage adjustment unit configured to detect a peak voltage of an input power supply voltage and outputs a line peak voltage inversely proportional to the peak voltage;

a multiplier configured to multiply a voltage inversely proportional to the line peak voltage output through the peak voltage adjustment unit and a voltage proportional to the snubber voltage to generate a reference voltage; and a control unit configured to compare the voltage supplied through the switching current sensing resistor with the reference voltage supplied through the multiplier, wherein the control unit supplies a logic signal at a relatively high level or a relatively low level in accordance with a comparison result to the switching unit to control the switching unit such that a secondary-side current of the transformer is maintained relatively constant.

9. The isolated flyback converter of claim 8, wherein the control unit is configured to performs critical conduction mode control such that the switching unit is turned on to maximize an inductor current of the transformer and the switching unit is then turned off to minimize the inductor current of the transformer to 0 A.

10. The isolated flyback converter of claim 8, wherein the peak voltage adjustment unit comprises:

a peak voltage detector configured to detect the line peak voltage and supplies the line peak voltage to the multiplier;

a multiplier configured to multiply the line peak voltage supplied from the peak voltage detector and a feedback output voltage; and a feedback amplifier configured to supply an amplifier output in response to an output of the multiplier.

11. The isolated flyback converter of claim 8, wherein an output of the peak voltage adjustment unit is expressed by the equation $$Av = \frac{Vref1}{K2 \cdot Vsup,\ pk},$$

wherein Vsup,pk is the line peak voltage and Vref1 is reference voltage of the peak voltage adjustment unit.

12. The isolated flyback converter of claim 8, wherein the reference voltage is expressed by the equation $$Vref = Vref1 \cdot \frac{K1}{K2} \cdot \frac{Vsup + N \cdot VF}{Vsup,\ pk},$$

wherein Vsup is power supply voltage supplied to the LED driver, VF is secondary-side voltage of the transformer, Vsup,pk is the line peak voltage, and Vref1 is reference voltage of the peak voltage adjustment unit.

13. The isolated flyback converter of claim 8, wherein the secondary-side current of the transformer is expressed by the equation $$ILED = 0.5 \times N \cdot \frac{K1}{K2} \cdot \frac{Vref1}{Rcs} \cdot |\sin\phi|,$$

wherein Rcs is resistance of the switching current sensing resistor, Vref1 is reference voltage of the peak voltage adjustment unit, and $|\sin\phi|$ is a value obtained by dividing the power supply voltage by the line peak voltage.

14. The isolated flyback converter of claim 8, wherein the control unit comprises:

a critical conduction mode timing generator configured to generate a set signal when an inductor current of the transformer is 0 A;

a comparator configured to compare the voltage supplied through the switching current sensing resistor with the reference voltage and output a logic signal according to a comparison result; and a latch circuit configured to be set or reset in response to the logic signal of the comparator to generate an output signal at a relatively high level or a relatively low level.

15. The isolated flyback converter of claim 8, wherein the snubber voltage detection unit comprises a first resistor and a second resistor and is configured to detect a voltage of a snubber capacitor of the snubber circuit unit.

16. An isolated flyback converter for an LED driver comprising:

a snubber circuit unit connected to the primary side of a transformer configured to substantially prevent overvoltage or overcurrent;

a snubber voltage detection unit is configured to detect a snubber voltage of the snubber circuit unit and generates a voltage proportional to the detected snubber voltage;

a switching unit with at least one of a source terminal connected to a switching current sensing resistor and a drain terminal connected to the snubber circuit unit, wherein the switching unit may be turned on or off in response to an arbitrary logic signal;

an average voltage adjustment unit configured to detect an average voltage of an input power supply voltage and output a line average voltage inversely proportional to the average voltage;

a multiplier configured to multiply a voltage inversely proportional to the line average voltage output through the average voltage adjustment unit and a voltage proportional to the snubber voltage to generate a reference voltage; and a control unit configured to compare the voltage supplied through the switching current sensing resistor with the reference voltage supplied through the multiplier, wherein the control unit is configured to supply a logic signal at a relatively high level or a relatively low level in accordance with a comparison result to the switching unit to control the switching unit such that a secondary-side current of the transformer is maintained relatively constant.

17. The isolated flyback converter of claim 16, wherein the control unit is configured to perform critical conduction mode control such that the switching unit is turned on to maximize an inductor current of the transformer and the switching unit may be then turned off to minimize the inductor current of the transformer to 0 A.

18. The isolated flyback converter of claim 16, wherein the average voltage adjustment unit comprises:

an average voltage detector configured to detect the line average voltage and supply the line average voltage to the multiplier;

a multiplier configured to multiply the line average voltage supplied from the average voltage detector and a feedback output voltage; and a feedback amplifier configured to supply an amplifier output in response to an output of the multiplier.

* * * * *